(12) United States Patent
Zhong (10) Patent No.: US 8,588,290 B2
(45) Date of Patent: Nov. 19, 2013

(54) ADAPTATION OF CROSSING LATCH THRESHOLD

(75) Inventor: Lizhi Zhong, Sunnyvale, CA (US)

(73) Assignee: LSI Corporation, San Jose, CA (US)

( * ) Notice: Subject to any disclaimer, the term of this patent is extended or adjusted under 35 U.S.C. 154(b) by 518 days.

(21) Appl. No.: 12/874,374

(22) Filed: Sep. 2, 2010

(65) Prior Publication Data

US 2012/0057626 A1 Mar. 8, 2012

(51) Int. Cl.
*H03H 7/30* (2006.01)

(52) U.S. Cl.
USPC .......................................... 375/233; 375/229

(58) Field of Classification Search
USPC ................................................. 375/232–233
See application file for complete search history.

(56) References Cited

U.S. PATENT DOCUMENTS

| 4,873,456 | A | 10/1989 | Olisar et al. ............... 307/272.1 |
| 7,286,621 | B1 * | 10/2007 | Schenk ......................... 375/350 |
| 2008/0080610 | A1 * | 4/2008 | Aziz et al. .................... 375/233 |
| 2009/0162068 | A1 * | 6/2009 | Wada et al. ..................... 398/81 |

* cited by examiner

*Primary Examiner* — Sam K Ahn
*Assistant Examiner* — Janice Tieu
(74) *Attorney, Agent, or Firm* — Christopher P. Maiorana, PC (57) ABSTRACT

An apparatus including a bang-bang clock and data recovery module and a decision feedback equalizer. The decision feedback equalizer is coupled with the bang-bang clock and data recovery module. The apparatus is configured to reduce an effect on a settling point of the bang-bang clock and data recovery module due to coupling between the bang-bang clock and data recovery module and the decision feedback equalizer.

20 Claims, 7 Drawing Sheets

ADAPTATION OF CROSSING LATCH THRESHOLD

FIELD OF THE INVENTION

The present invention relates to latches generally and, more particularly, to a method and/or apparatus for adaptation of a crossing latch threshold.

BACKGROUND OF THE INVENTION

Clock and Data Recovery (CDR) circuits form a part of Serializer/Deserializer (SerDes) receivers. The CDR circuits track the phase of a sampling clock based on some criterion, such as minimizing a Mean-Squared-Error (MSE). Conventional CDR circuits are commonly designed to achieve low target bit-error-ratios (BER) on the order of $10^{-12}$ to $10^{-15}$ errors per bit. One category of CDR circuits commonly used is bang-bang CDR. Bang-bang CDR is widely used in SerDes circuits due to superior jitter tolerance and insensitivity to the Nyquist data pattern (i.e., 1010 . . . ).

When bang-bang CDR and a decision feedback equalizer (DFE) are implemented together in a receiver, coupling between bang-bang timing loops and the DFE occurs. Due to the coupling, the point at which bang-bang CDR will settle moves to the left of the pulse response (or the left of center with respect to the slicer input eye). The coupling between bang-bang timing loops and the DFE feedback can cause the sampling phase to continue moving further to the left, creating a snowball effect that can result in error propagation. The jitter tolerance of bang-bang CDR is reduced since the sampling phase is no longer at the center of the eye.

It would be desirable to have a method and/or apparatus to eliminate coupling between bang-bang CDR and DFE when implemented.

SUMMARY OF THE INVENTION

The present invention concerns an apparatus including a bang-bang clock and data recovery module and a decision feedback equalizer. The decision feedback equalizer is coupled with the bang-bang clock and data recovery module. The apparatus is configured to reduce an effect on a settling point of the bang-bang clock and data recovery module due to coupling between the bang-bang clock and data recovery module and the decision feedback equalizer.

The objects, features and advantages of the present invention include providing a method and/or apparatus for adaptation of a crossing latch threshold that may (i) adapt the crossing latch threshold in a different manner than conventional techniques, (ii) attempt to undo an effect of DFE on bang-bang CDR rather than remove the crossing inter symbol interference (ISI) all together, and/or (iii) be unrolled to meet timing constraints.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

In one embodiment the present invention generally provides a new way to adapt the crossing latch threshold in a bang-bang CDR application. Embodiments of the present invention eliminate the coupling between bang-bang timing loops and DFE rather than removing the crossing ISI, as other schemes attempt to do. Advantages of the present invention include allowing the adaptation of the crossing latch threshold to move and decoupling bang-bang timing loop from DFE.

Figure 1:
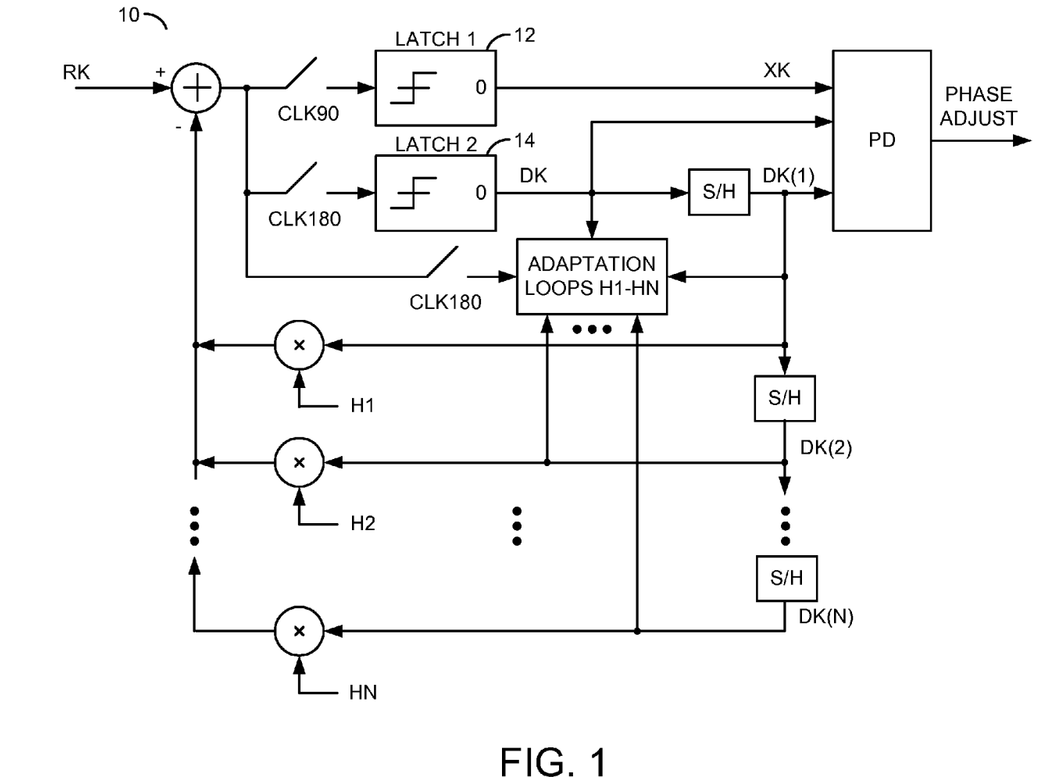
FIG. 1 is a block diagram illustrating a receiver circuit implementing bang-bang CDR and DFE.

Referring to FIG. 1, a diagram of a circuit 10 is shown illustrating a SerDes receiver implementing bang-bang CDR and DFE. In a bang-bang, or Alexander type CDR, a received signal (e.g., RK) is sampled twice each symbol period. The symbol period is called a Unit Interval (UI). Ideally, one sample is obtained at a crossing boundary by a crossing latch 12 and another sample is obtained at a center of a slicer input "eye" by a data latch 14. The crossing sample and data sample are controlled by respective clock signals (e.g., CLK90 and CLK180). The clock signals CLK90 and CLK180 have phases that are 90 degrees apart. Two consecutive "center" data samples (e.g., DK(1) and DK) and the crossing sample in-between (e.g., XK) may be used to decide whether the current sampling phase is lagging or leading. The sampling phase may then be corrected accordingly.

Bang-bang CDR is widely used in SerDes circuits due to superior jitter tolerance and insensitivity to the Nyquist data pattern (i.e., 1010 . . . ). However, bang-bang CDR may function as a one-tap edge-equalized decision feedback equalizer (DFE): EK*DK(1). The error signal EK is defined the same way as that for edge equalization: EK=XK if DK=−DK(1) and EK=0 otherwise. The signal XK is the crossing sample at the kth symbol (e.g., the crossing is between the data sample of the (k−1)th symbol (e.g., DK(1)) and the data sample of the kth symbol (e.g., DK). As used herein, DK represents the data sample of the kth symbol (or current data sample), DK(1) represents the data sample of the (k−1)th symbol (or previous data sample), and DK(x) represents the data sample of the (k−x)th symbol. If the previous data sample DK(1) is negative, the current data sample DK is positive, and the crossing sample XK is positive, the phase should be reduced to move the sampling point left. According to EK*DK(1)=XK*DK(1)=1*(−1)=−1, the phase should also move left. In general, bang-bang CDR works in exactly the same way as a one-tap edge-equalized DFE for all combinations of DK(1), DK, and XK, except the cases where DK(1), DK, and XK are all 1 or −1.

For the above reason, bang-bang CDR will settle to where XK*DK(1)=0. XK may be expressed by the following Equation 1:

$$XK=(P(0.5)-P(-0.5))*DK(1)+P(1.5)*DK(2)+\ldots,\qquad \text{EQ. 1}$$

where P(0.5) is the pulse response sampled at t=0.5 UI, and similar notations for others terms. Applying Equation 1, $XK*DK(1)=(P(0.5)-P(-0.5))*DK(1)*DK(1)+P(1.5)*DK(1)*DK(2)+$. Because $DK(1)=1$ or $-1$, $DK(1)*DK(1)=1$ all the time. Because $DK(1)$ and $DK(2)$ are independent and are either 1 or $-1$, a long term average of $XK*DK(1)$ will have the term related to $DK(1)*DK(2)$ tend to be zero. A similar result occurs for the other terms as well. Consequently, the long term average (e.g., performed by a large accumulator) of $XK*DK(1)$ is $P(0.5)-P(-0.5)$. Therefore, without the DFE feedback, bang-bang CDR would settle to where the long term average is zero, or $P(0.5)-P(-0.5)=0$.

Figure 2:
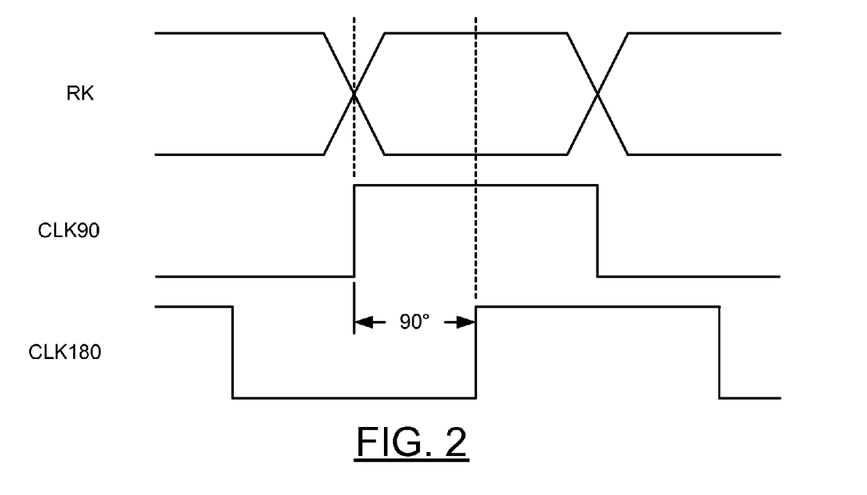
FIG. 2 is a diagram illustrating relationships between clock signals and a data sampling eye.

Referring to FIG. 2, a diagram is shown illustrating a phase relationship between a first clock signal (e.g., CLK90), a second clock signal (e.g., CLK180), and a data sampling input eye. In one example, a rising edge of the clock signal CLK180 generally occurs 90 degrees after a rising edge of the clock signal CLK180. The phase and frequency of the clock signals CLK90 and CLK180 may be adjusted such that the rising edge of the clock signal CLK90 corresponds with the crossing point of the signal RK and the rising edge of the clock signal CLK180 corresponds with the center of a data input eye for the signal RK.

Figure 3:
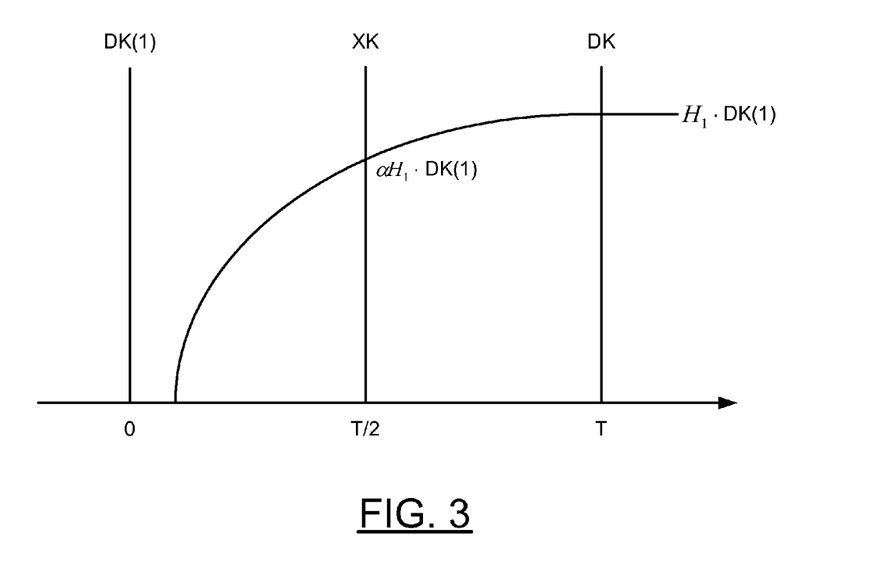
FIG. 3 is a diagram illustrating a DFE feedback waveform.

Referring to FIG. 3, a diagram is shown illustrating a DFE feedback waveform. When bang-bang CDR is used together with a DFE, coupling between the bang-bang CDR and the DFE occurs for the reason presented above. The DFE feedback is not only applied at the data sample, but also at the crossing sample. In general, a significant portion of the DFE feedback may be applied at the crossing. For example, if the first tap DFE feedback applied at the data sample is expressed as $H1*DK(1)$, the DFE feedback applied at the crossing sample may be expressed as $ALPHA*H1*DK(1)$, where ALPHA may range from 40% to 90%, depending on the implementation. The DFE feedback is generally applied at the crossing because the feedback takes some time to reach the full level desired for application at the data sample (e.g., $H1*DK(1)$). Halfway there, at crossing, the feedback is already $ALPHA*H1*DK(1)$.

Figure 4A:
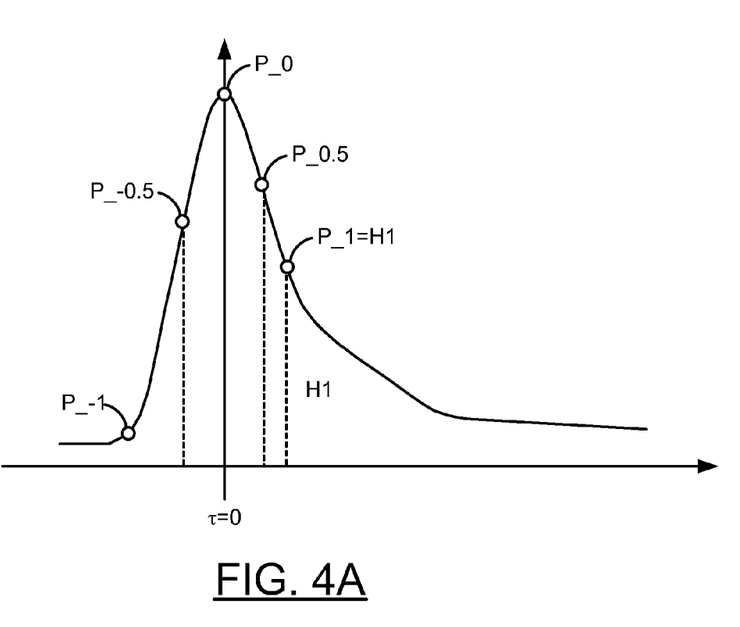
FIGS. 4A and 4B are diagrams illustrating a shift in sampling time due to coupling between bang-bang CDR and DFE.
Figure 4B:
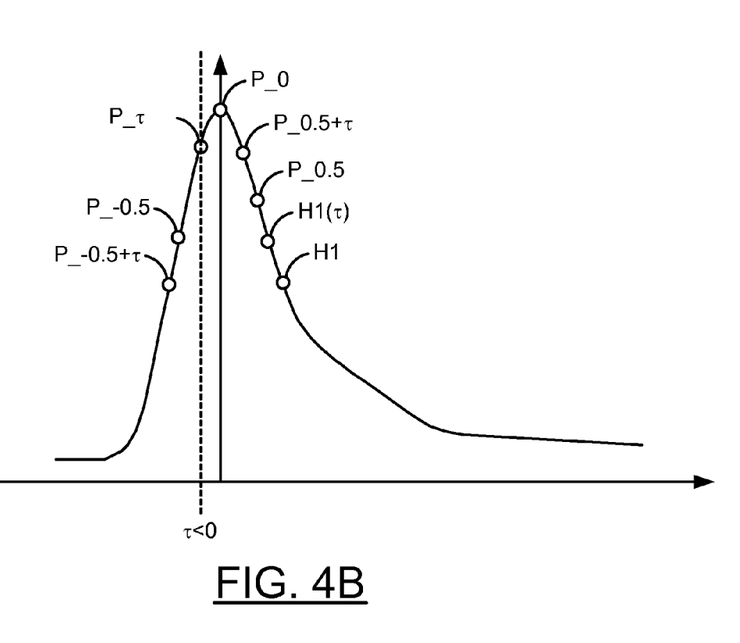

Referring to FIGS. 4A and 4B, diagrams are shown illustrating effects of DFE feedback on sampling phase when no coupling is present (FIG. 4A) and when coupling occurs (FIG. 4B). Taking the DFE feedback into account, Equation 1 may be rewritten as the following Equation 2:

$$XK=(P(0.5)-P(-0.5))*DK(1)-ALPHA*H1*DK(1)+P(1.5)*DK(2)+\ldots \qquad \text{Eq. 2}$$

Based on Equation 2, when a DFE is used with the bang-bang CDR, the bang-bang CDR will settle to where $P(0.5)-P(-0.5)-ALPHA*H1=0$. H1 is generally set to $P\_1$, or converged to $P\_1$ with least mean squares (LMS) adaptation (described below in connection with FIG. 6). In general, the DFE will influence where the bang-bang CDR settles through the term $ALPHA*H1$. For example, in an ideal case where $ALPHA=0$ (FIG. 4A), the bang-bang CDR will settle to where $P(0.5)=P(-0.5)$. However, if $ALPHA>0$, the bang-bang CDR will reduce $P(0.5)$ to $P(0.5)-ALPHA*H1$. To keep $P(0.5)$ the same as $P(-0.5)$, the bang-bang CDR moves the sampling phase left to increase $P(0.5)$ and reduce $P(-0.5)$ until a new balance point is reached where $P(0.5)-P(-0.5)-ALPHA*H1=0$. The values $P(0.5)$ and $P(-0.5)$ change with the sampling phase.

Referring to FIG. 4B, the coupling between bang-bang CDR and DFE will cause bang-bang CDR to settle to the left (e.g., $\tau<0$) of the pulse response (or the left of the center of the input eye). When the sampling phase is moved to the left, H1 will also increase (e.g., to $H1(\tau)$). When H1 increases, $ALPHA*H1$ increases causing the sampling phase to move further to the left. A snowball effect may result that produces a very large H1 value, which causes error propagation. The jitter tolerance of bang-bang CDR is reduced since the sampling phase is no longer at the center of the eye.

Figure 5:
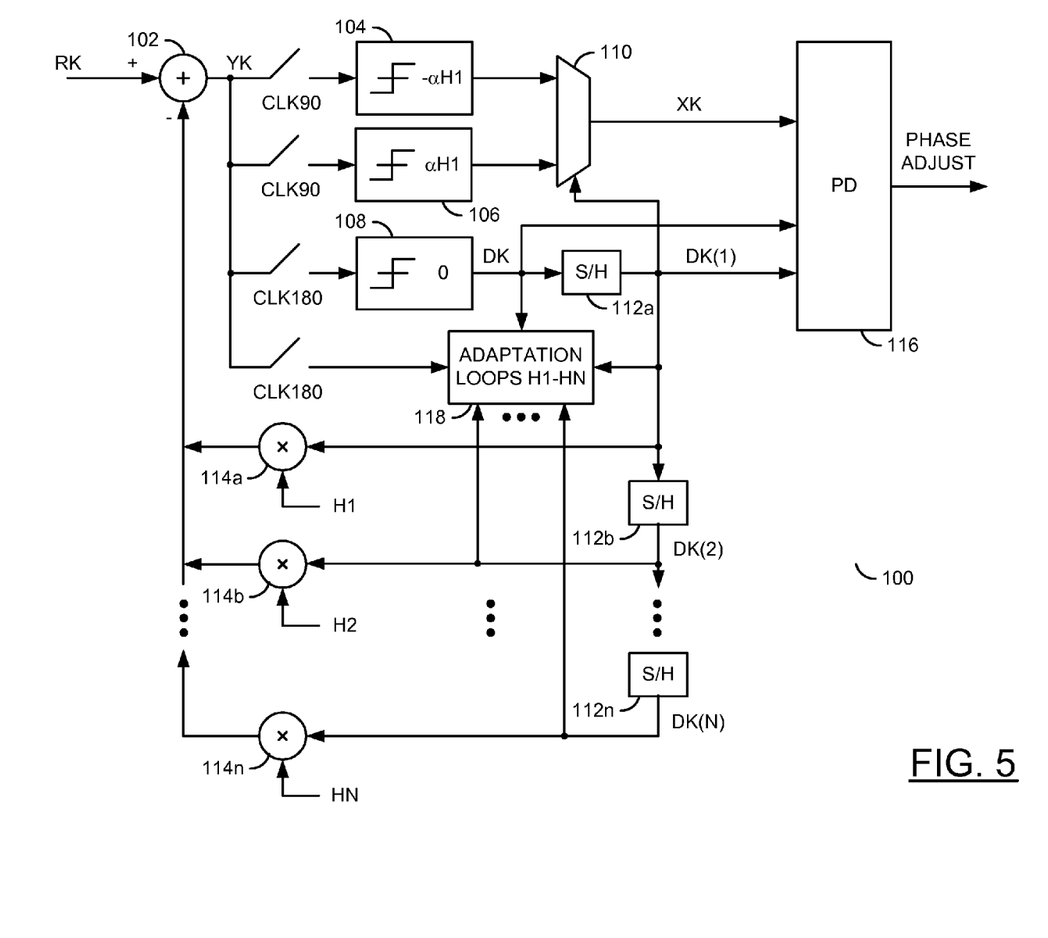
FIG. 5 is a block diagram illustrating a receiver circuit implementing bang-bang CDR and DFE in accordance with an embodiment of the present invention.

Referring to FIG. 5, a block diagram of a circuit 100 is shown illustrating a receiver implementing bang-bang CDR and DFE in accordance with an example embodiment of the present invention. The circuit 100 may be implemented with an adaptive crossing latch threshold. The circuit 100 generally comprises a block (or circuit) 102, a block (or circuit) 104, a block (or circuit) 106, a block (or circuit) 108, a block (or circuit) 110, a number of blocks (or circuits) 112a-112n, a number of blocks (or circuits) (or circuit) 114a-114n, a block (or circuit) 116, and a block (or circuit) 118. The circuits 102 to 118 may represent modules and/or blocks that may be implemented as hardware, software, a combination of hardware and software, or other implementations. The circuit 102 may be implemented as an adder. The circuit 104 may be implemented as a crossing latch. The circuit 106 may be implemented as a crossing latch. The circuit 108 may be implemented as a data latch. The circuit 110 may be implemented as a multiplexer. The circuits 112a-112n may be implemented sample and hold or shift register elements. The circuits 114a-114n may be implemented as multipliers. The circuit 116 may be implemented as a phase detector (PD). The circuit 118 may comprise adaptation loops configured to determine a number of tap weight values (e.g., H1-HN) for a number of DFE taps.

The circuit 102 may receive an input signal (e.g., RK) at a first input and a feedback signal at a second input. An output of the circuit 102 may present a signal (e.g., YK) responsive to the input signal and the feedback signal to the circuits 104, 106 and 108. Specifically, the signal YK may be sampled in response to a first clock signal (e.g., CLK90) and presented to a first input of the block 104 and a first input of the circuit 106. The signal YK may also be sampled in response to a second clock (e.g., CLK180) and presented to an input of the circuit 108 and an input of the circuit 118. The circuit 104 may have a first adaptable crossing threshold (e.g., $-ALPHA*H1$). The circuit 106 may have a second adaptable crossing threshold (e.g., $ALPHA*H1$). The circuit 108 may have a crossing threshold of zero. The circuits 104, 106 and 108 generally present a positive (e.g., 1) output when the sampled signal is above the respective threshold and a negative (e.g., $-1$) output when the sampled signal is below the respective threshold. The output of the latches 104, 106 and 108 is randomly 1 or $-1$ when the respective input signals are very close to the threshold value since the difference may be very small and below the sensitivity of the latch (e.g., may take a very long time to integrate to produce a signal that is large enough).

An output of the circuit 104 may be presented to a first input of the circuit 110. An output of the circuit 106 may be presented to a second input of the circuit 110. An output of the circuit 108 (e.g., DK) may be presented to an input of the circuit 112a, a first input of the circuit 116, and an input of the circuit 118. An output of the circuit 110 may be presented to a first input of the circuit 116. An output of the circuit 112a (e.g., DK(1)) may be presented to a control input of the circuit 110, an input of the circuit 112b, and a first input of the circuit 114a, a second input of the circuit 116, and a second input of the circuit 118. The circuit 114a may have a second input that may receive a signal (e.g., H1). The signal H1 may represent a tap weight. The circuits 114b-114n may similarly receive respective tap weight signals (e.g., H2 to HN) and data samples (e.g., DK(2)-DK(N)).

The circuit 118 may determined, through adaptation, the tap weights H1-HN based on the signals YK, DK, DK(1), DK(N). In one example, the circuit 118 implement a sign-sign LMS technique to adjust the tap weights based on an error signal and the data samples. The circuits 112a-112n and 114a-114n are generally part of a decision feedback equalizer that may be implemented using conventional techniques. Outputs of the circuits 114a-114n generally present components of the feedback signal presented to the second input of the circuit 102. The circuit 116 may have an output that may present a signal (e.g., PHASE ADJUST) that may be used to adjust a sampling phase of the receiver. In one example, the circuit 116 may be configured to implement a transfer function represented by the following TABLE 1.

TABLE 1

| XK | DK(1) | DK | PHASE UP OR DOWN |
|---|---|---|---|
| 1 | 1 | −1 | 1 |
| −1 | 1 | −1 | −1 |
| 1 | −1 | 1 | −1 |
| −1 | −1 | 1 | 1 |
| 1 | 1 | 1 | 0 |
| −1 | 1 | 1 | −1 |
| −1 | −1 | −1 | 0 |
| 1 | −1 | −1 | −1 |

Figure 6:
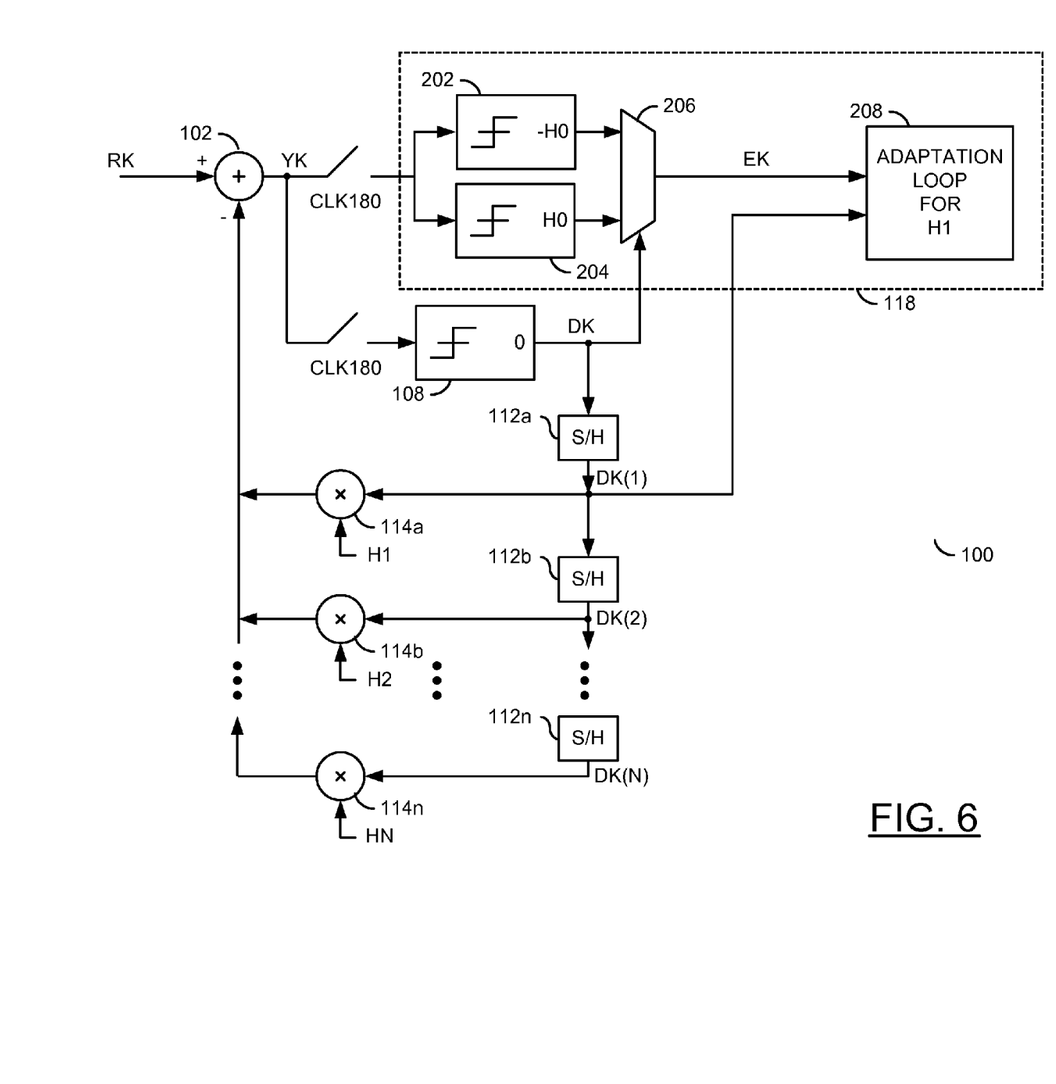
FIG. 6 is a block diagram illustrating an adaptation loop in accordance with an embodiment of the present invention.

Referring to FIG. 6, a block diagram of the circuit 100 is shown illustrating an example implementation of an adaptation loop for the first DFE tap H1 implemented in accordance with an example embodiment of the present invention. The crossing latches 104 and 106 have been omitted for clarity. The adaptation loops 118 include an adaptation loop for the first DFE tap H1. In one example, the adaptation loop for the first DFE tap H1 may comprise a block (or circuit) 202, a block (or circuit) 204, a block (or circuit) 206, and a block (or circuit) 208. The circuit 202 may be implemented as a crossing latch. The circuit 204 may be implemented as a crossing latch. The circuit 206 may be implemented as a multiplexer. The circuit 208 may implement, in one example, a sign-sign least mean squares (LMS) technique to adjust the tap weight of the first DFE tap H1.

The signal YK may be sampled in response to the clock signal CLK180 and the samples presented to an input of the circuit 202 and an input of the circuit 204. The circuits 202 and 204 may have crossing latch thresholds of −H0 and H0, respectively. The value H0 is the target level of the receiver 100, which is adapted to match the received signal amplitude. An output of the circuit 202 may be presented to a first input of the circuit 206. An output of the circuit 204 may be presented to a second input of the circuit 206. A control input of the circuit 206 may receive the signal DK from an output of the circuit 108. The circuit 206 may have an output that may present a signal (e.g., EK). The signal EK may be implemented as an error signal. The output of the circuit 206 may be presented to a first input of the circuit 208. The signal DK(1) may be presented to a second input of the circuit 208. The circuit 208 generally adjusts the tap weight value of the first DFE tap H1 based on a sign-sign least mean squares (LMS) calculation using the signal EK and the signal DK(1).

Figure 7:
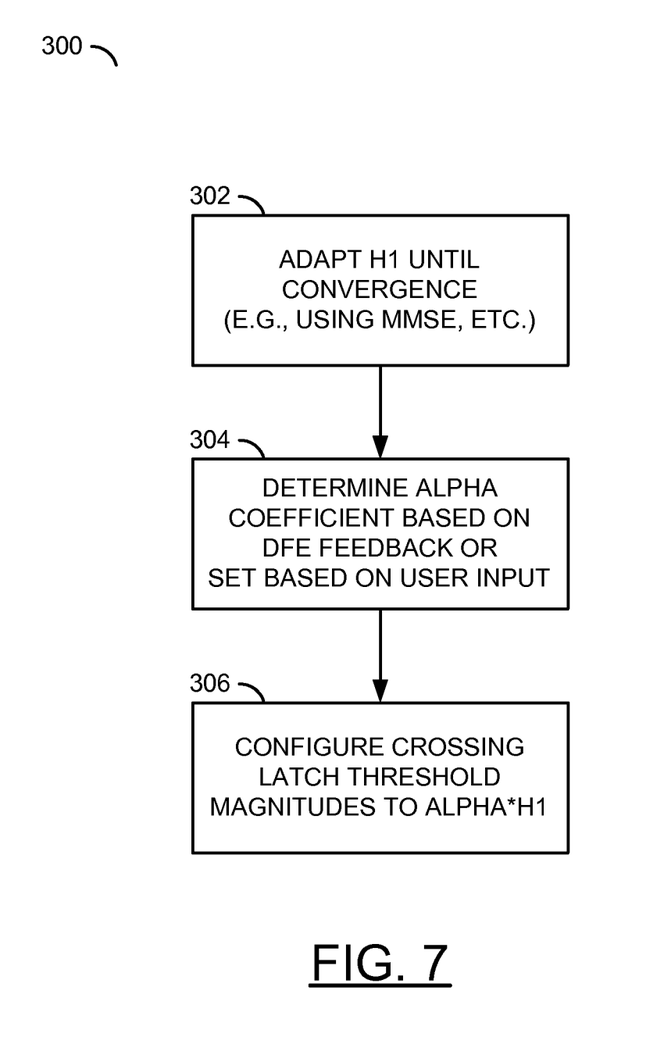
FIG. 7 is a flow diagram illustrating an adaptation process in accordance with the present invention.

Referring to FIG. 7, a flow diagram is shown illustrating a process (or method) 200 in accordance with an example embodiment of the present invention. The method 200 may comprise a step (or state) 202, a step (or state) 204, and a step (or state) 206. The step 202 may comprise adapting the tap weight H1 until convergence. The process of adapting the tap weight may use methods such as MMSE, etc. When the tap weight H1 has converged to a value, the process 200 may move to the step 204. In the step 204, the process 200 determines the coefficient ALPHA based on feedback signal from the DFE portion of the circuit 100 or based upon a user input as part of the configuration of the circuit 100. When the coefficient ALPHA has been determined, the process 200 may move to the step 206. In the step 206, the process 200 configures the crossing latch threshold magnitudes for the crossing latches 104 and 106 to −ALPHA*H1 and ALPHA*H1, respectively.

A process in accordance with embodiments of the present invention generally introduces a modification to the bang-bang CDR equation. Instead of determining phase corrections according to the equation XK*DK(1), the process and/or apparatus in accordance with embodiments of the present invention generally determine sampling phase corrections based upon the equation (XK+ALPHA*H1*DK(1))*DK(1). In general, the long term average of (XK+ALPHA*H1*DK(1))*DK(1) is (P(0.5)−P(−0.5))−ALPHA*H1+ALPHA*H1=P(0.5)−P(−0.5). In a receiver implemented in accordance with embodiments of the present invention, the point to which bang-bang CDR settles is generally independent of the DFE feedback. As a result, the coupling between the two is eliminated. For example, the term XK+ALPHA*H1*DK(1) may be treated as a new crossing sample, which is the original crossing sample XK with the feedback ALPHA*H1*DK(1).

A single crossing latch may be used in low data rate applications. The feedback of ALPHA*H1*DK(1) may be applied before the crossing latch. However, if the data rate is high, the feedback needs to be unrolled. For example, two crossing latches may be implemented. A first offset (or threshold) of the first crossing latch may be set to −ALPHA*H1, assuming DK(1)=1, and a second offset (or threshold) of the second crossing latch may be set to ALPHA*H1, assuming DK(1)=−1. Once DK(1) is settled, a multiplexer may be used to choose the output of the corresponding crossing latch based on the value of DK(1). The advantage is that no feedback is required and the implementation can meet the timing criteria more easily.

Figure 8:
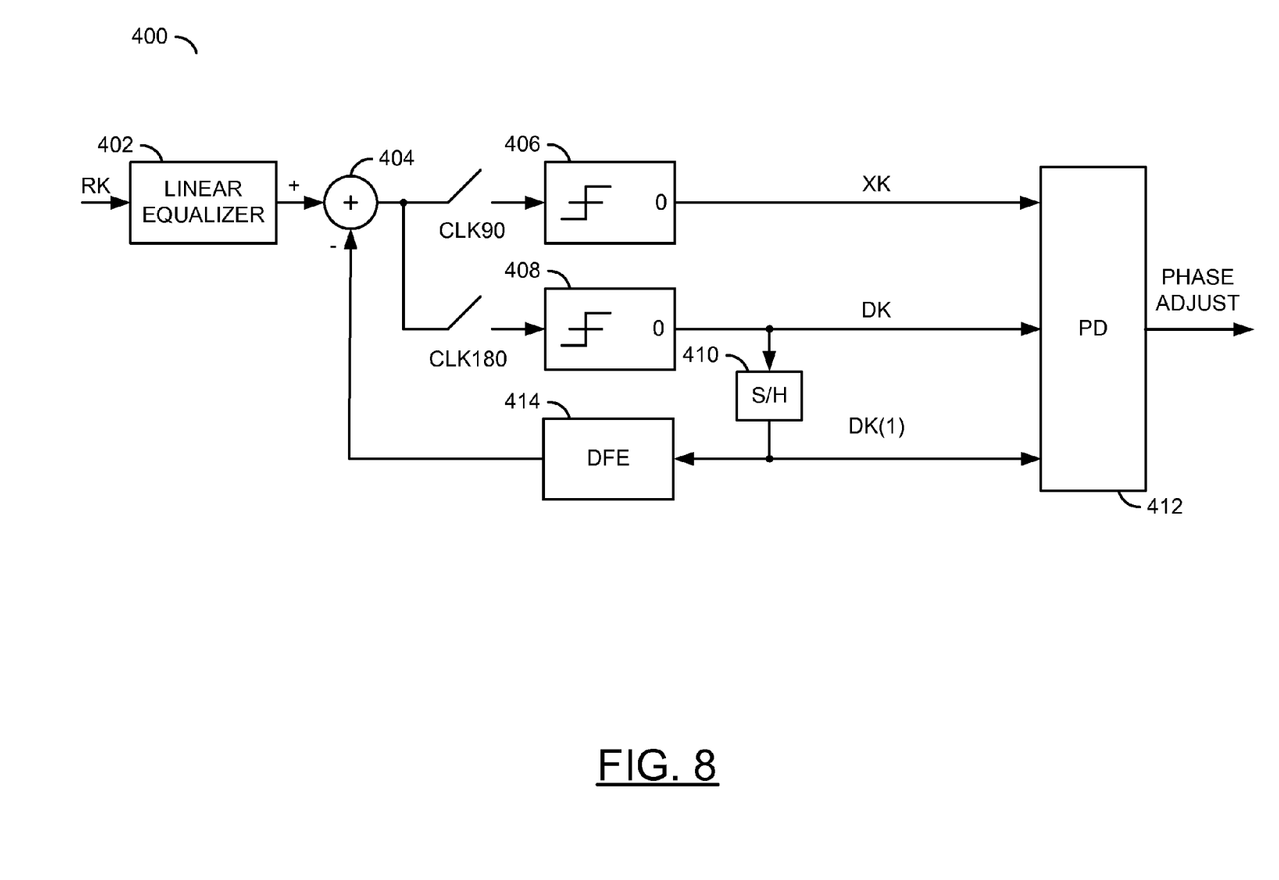
FIG. 8 is a block diagram illustrating another example embodiment of a receiver in accordance with the present invention.

Referring to FIG. 8, a block diagram of a circuit 400 is shown illustrating a receiver implemented in accordance with another example embodiment of the present invention. The circuit 400 may comprise a block (or circuit) 402, a block (or circuit) 404, a block (or circuit) 406, a block (or circuit) 408, a block (or circuit) 410, a block (or circuit) 412, and a block (or circuit) 414. The circuit 402 may be implemented as a linear equalizer. In one example, the circuit 402 may be implemented as a feed forward equalizer (FFE), a continuous time filter (CTF), or a finite impulse response (FIR) filter. The circuit 404 may be implemented as an adder. The circuit 406 may be implemented as a crossing latch. The circuit 408 may be implemented as a data latch. The circuit 410 may be implemented as a storage or delay element (e.g., sample and hold, shift register element, etc.). The circuit 412 may be implemented as a phase detector. The circuit 414 may be implemented as a decision feedback equalizer (DFE).

The circuit 402 may be used to shape the pulse response at the input of DFE 414 such that P(0.5) is increased to compensate for the potential reduction from the feedback generated by the DFE 414. The circuit 402 may have an input that may receive an input signal (e.g., RK) and an output that may present a signal to a first input of the circuit 404. The circuit 404 may receive a feedback signal at a second input and present an output signal (e.g., YK) responsive to the input signal and the feedback signal to the circuits 406 and 408. Specifically, the signal YK may be sampled in response to a first clock signal (e.g., CLK90) and presented to an input of the circuit 406. The signal YK may also be sampled in response to a second clock (e.g., CLK180) and presented to an input of the circuit 408. The circuit 406 may have a crossing threshold of zero. The circuit 408 may have a crossing threshold of zero. The circuits 406 and 408 generally present a positive (e.g., 1) output when the sampled signal is above the respective threshold and a negative (e.g., −1) output when the sampled signal is below the respective threshold. The output of the latches 406 and 408 is randomly 1 or −1 when the respective input signals are very close to the threshold value since the difference may be very small and below the sensitivity of the latch (e.g., may take a very long time to integrate to produce a signal that is large enough).

An output of the circuit 406 (e.g., XK) may be presented to a first input of the circuit 412. An output of the circuit 408 (e.g., DK) may be presented to an input of the circuit 410 and a second input of the circuit 412. An output of the circuit 410 (e.g., DK(1)) may be presented to a third input of the circuit 412 and an input of the circuit 414. An output of the circuit 414 generally presents the feedback signal to the second input of the circuit 404. The circuit 414 may be implemented using conventional techniques. An output of the circuit 412 may present a signal (e.g., PHASE ADJUST) that may be used to adjust a sampling phase of the receiver 400.

A receiver implemented in accordance with the present invention may employ a new approach to adapt a crossing latch threshold. Adaptation of the crossing latch threshold in accordance with the present invention may reduce or eliminate the effect of DFE on bang-bang CDR. The feedback to the crossing sample may be unrolled to meet timing constraints. The adaptation of crossing latch thresholds in accordance with the present invention generally provides advantages including decoupling bang-bang CDR from DFE, increasing jitter tolerance, reducing error propagation, and reducing the bit error rate (BER), thus enhancing performance.

The functions performed by the diagram of FIG. 7 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products) or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMS (random access memories), EPROMs (electronically programmable ROMs), EEPROMs (electronically erasable ROMs), UVPROM (ultra-violet erasable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, storage and/or playback devices, video recording, storage and/or playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the scope of the invention.

The invention claimed is:

1. An apparatus comprising:
a bang-bang clock and data recovery module; and
a decision feedback equalizer coupled with said bang-bang clock and data recovery module, wherein said apparatus is configured to reduce an effect on a settling point of said bang-bang clock and data recovery module due to coupling between said bang-bang clock and data recovery module and said decision feedback equalizer by generating a crossing sample based on a threshold determined by a product of (i) a coefficient set either based upon a feedback waveform of a first tap of the decision feedback equalizer or based upon user configuration information, (ii) a tap weight of said first tap of said decision feedback equalizer, and a data sample taken immediately prior to a crossing corresponding to said crossing sample.

2. The apparatus according to claim 1, wherein a threshold magnitude of a crossing latch of said bang-bang clock and data recovery module is adjusted based upon a product of said coefficient and said tap weight of said first tap of the decision feedback equalizer.

3. The apparatus according to claim 1, wherein said bang-bang clock and data recovery module further comprises:
a first crossing latch having a first adaptable threshold, said first adaptable threshold being determined by a product of said coefficient, said tap weight of the first tap of the decision feedback equalizer, and negative one;

a second crossing latch having a second adaptable threshold, said second adaptable threshold being determined by a product of said coefficient and said tap weight of the first tap of the decision feedback equalizer; and a multiplexer configured to select an output of either said first crossing latch or said second crossing for presentation as said crossing sample in response to said value of said data sample taken immediately prior to said crossing corresponding to said crossing sample, wherein said crossing is sampled by said first and second crossing latches.

4. The apparatus according to claim 1, wherein said bang-bang clock and data recovery module further comprises a phase detector configured to adjust a sampling phase of said apparatus in response to said crossing sample, said data sample taken immediately prior to said crossing sample, and a current data sample taken immediately following said crossing sampled.

5. The apparatus according to claim 4, wherein said phase detector is configured to generate a phase adjustment signal that adjusts said sampling phase of said apparatus.

6. The apparatus according to claim 1, further comprising and adaptation loop configured to determine said tap weight for the first tap of the decision feedback equalizer.

7. The apparatus according to claim 6, wherein said adaptation loop is configured to implement a sign-sign least means square (LMS) technique to adjust said tap weight based on an error signal and said data sample taken immediately prior to said crossing sample.

8. The apparatus according to claim 6, wherein said adaptation loop comprises:
a first crossing latch having a first threshold determined by a target level of said decision feedback equalizer;
a second crossing latch a having a second threshold determined by a product of said target level of said decision feedback equalizer and negative one; and
a multiplexer configured to select an output of either said first crossing latch or said second crossing latch for presentation as an error sample in response to a value of a current data sample.

9. The apparatus according to claim 1, further comprising a linear equalizer configured to shape an input pulse response of said apparatus to compensate for feedback from said decision feedback equalizer.

10. The apparatus according to claim 9, wherein said linear equalizer comprises a feed forward equalizer (FFE).

11. The apparatus according to claim 9, wherein said linear equalizer comprises a continuous time filter (CTF).

12. The apparatus according to claim 9, wherein said linear equalizer comprises a finite impulse response filter (FIR).

13. An apparatus comprising:
bang-bang clock and data recovery circuit; and
means for performing decision feedback equalization coupled with said bang-bang clock and data recovery circuit, wherein said apparatus is configured to reduce an effect on a settling point of said bang-bang clock and data recovery circuit due to coupling between said bang-bang clock and data recovery circuit and said decision feedback equalization means by generating a crossing sample based on a threshold determined by a product of (i) a coefficient set either based upon a feedback waveform of a first tap of the means for performing decision feedback equalization or based upon user configuration information, (ii) a tap weight of said first tap of said means for performing decision feedback equalization, and a data sample taken immediately prior to a crossing corresponding to said crossing sample.

14. A method for adaptation of a crossing latch threshold in a receiver comprising the steps of:
(A) adapting a tap weight of a first tap of a decision feedback equalizer until convergence;
(B) determining a coefficient value based on a feedback waveform of the first tap of the decision feedback equalizer; and
(C) setting one or more crossing latch threshold magnitudes of a bang-bang clock and data recovery module based upon a product of the coefficient value and the tap weight of the first tap of the decision feedback equalizer.

15. The method according to claim 14, wherein said receiver is part of a serializer/deserializer (SerDes).

16. The method according to claim 14, wherein adapting said tap weight comprises:
generating two samples of an input signal of said receiver;
generating a current data sample from one of the samples of the input signal based on a zero valued threshold;
generating an error signal based upon the other of the samples of said input signal, the current data sample, and a target level of the decision feedback equalizer;
adjusting said tap weight based on said error signal and a previous data sample.

17. The method according to claim 16, wherein said tap weight is adjusted using a sign-sign least mean squares (LMS) technique.

18. The method according to claim 14, wherein:
a first one of said crossing latch threshold magnitudes of said bang-bang clock and data recovery module is set based on said product of said coefficient value and said tap weight; and
a second one of said crossing latch threshold magnitudes of said bang-bang clock and data recovery module is set based on a complement of said product of said coefficient value and said tap weight.

19. The method according to claim 14, further comprising:
generating a crossing sample based on said crossing latch threshold magnitudes and a previous data sample; and
adjusting a sampling phase of said receiver based upon said crossing sample, said previous data sample and a current data sample.

20. The method according to claim 14, further comprising the step of:
shaping an input pulse response of said receiver to compensate for feedback from said decision feedback equalizer.

* * * * *